3,701,755
PRODUCTION OF ELASTOMERS
Misao Sumoto, Hideki Komagata, Hiroshi Matsumoto, and Hironobu Furusawa, Ootsu, Japan, assignors to Toyo Boseki Kabushiki Kaisha, Osaka, Japan
No Drawing. Filed Dec. 3, 1969, Ser. No. 881,906
Claims priority, application Japan, Dec. 4, 1968, 43/89,224; June 4, 1969, 44/44,170
Int. Cl. C08g 17/08
U.S. Cl. 260—75 R                    3 Claims

ABSTRACT OF THE DISCLOSURE

The present invention relates to a process for producing elastomeric polyethylene terephthalate-poly(tetramethylene oxide) glycol block copolymers which comprises reacting poly (tetramethylene oxide) glycol, average molecular weight 1800 to 2500, with terephthalic acid (3 to 5 parts per part of glycol). The reaction is carried out until the specific viscosity $\eta_{sp./c.}$ of the copolymer is equal to or greater than $0.05x - 1.75$ wherein $x$ is the glycol unit in the copolymer.

---

This invention relates to a process for producing elastomers. More particularly the present invention relates to a process for producing an elastic polyester polyether block copolymer consisting of polyethylene terephthalate as hard segments and poly(tetramethylene oxide)glycol as soft segments.

It has been attempted to produce synthetic polymers to replace rubber, for producing elastic articles such as filaments, films and others, particularly elastic filaments for clothing, and various kinds of elastic polymers have been already suggested, among which is a polyester polyether block copolymer (U.S. Pat. No. 3,023,192). Such polyester polyether block copolymer can be produced much more cheaply than Spandex of polyurethane type which is a typical synthetic elastomer, but has not yet been put into commercial practice because, as evident from the typical comparison made in the following Table 1, the properties of the conventional polyester polyether block copolymer or elastic yarn obtained therefrom are remarkably inferior to those of Spandex and rubber yarns.

TABLE 1

| | Tenacity (g./d.) | Elongation (percent) | Stress decay (percent) |
|---|---|---|---|
| Polyester polyether elastic yarn [1] | 0.1–0.2 | 430 | 9–11 |
| Spandex | ca. 1 | 550–700 | 1–3 |
| Rubber yarn | ca. 0.2 | 600–750 | ([2]) |

[1] Example given in U.S. Patent No. 3,023,192.
[2] Substantially 0.

Therefore, it is an object of this invention to provide an improved polyester polyether block copolymer elastomer suitable to produce elastic yarns, films and other shaped articles excellent in the elastic properties, particularly in the tenacity, elongation and elastic recovery from high elongation.

It is also an object of this invention to provide a novel process for producing such polyester polyether block copolymers.

When poly(tetramethylene oxide)glycol (hereinafter referred to as PTMG) is used as the soft segment for the block copolymer, there has conventionally been recommended (U.S. Pat. No. 3,023,192) to produce a block copolymer containing 40–70% by weight of PTMG-aromatic acid ester units derived from PTMG with a molecular weight of 800–1800. When the PTMG content is higher than that, the filament forming ability of the resulting block copolymer and the quality of the filament made from such copolymer are poor so that the product is practically not useful.

However, it has now unexpectedly found that, if PTMG of a molecular weight in a certain higher range is selected and the degree of polymerization of the copolymer is sufficiently elevated, there is obtained an elastomer (rather in a high PTMG content exceeding 70%) of excellent properties suitable for the production of elastic yarn comparable to Spandex.

Thus, according to the present invention there is provided a process for producing an elastomeric polyester polyether block copolymer by reacting polyethylene terephthalate-forming component(s) and PTMG together, characterized in that PTMG having an average molecular weight of 1800 to 2500 is used, the molar ratio of PTMG to terephthalic acid is made 1:3–5 and the polycondensation reaction is conducted until the reduced specific viscosity of the copolymer reaches a value represented by the formula $$\eta_{sp./c.} \geq 0.05x - 1.75 \qquad (1)$$

wherein $x$ is percent by weight of the PTMG unit in the copolymer and $\eta_{sp./c.}$ is determined in a method to be explained hereinlater.

The elastomer obtained by the present invention is suitable particularly to the production of elastic yarns having excellent properties. Therefore, the various requirements in the method of this invention will be explained in more details in relation to the properties of the elastic yarn produced from the resulting elastomer.

The three novel requirements in the invention, i.e. molecular weight of PTMG, molar ratio of PTMG to terephthalic acid and the reduced specific viscosity of the copolymer are correlated with each other so that, if any of them is not satisfied, no satisfactory elastic yarn is obtained.

First of all, the reduced specific viscosity of the copolymer will now be explained. It is the most fundamental requirement of the present invention to make a high viscosity (high molecular weight) copolymer satisfying the above indicated Formula 1. The same as in fibers produced from many other polymers, it is most effective to increase the molecular weight of the polymer in order to increase the tenacity of the yarn to be produced therefrom. In the case of the method of the present invention wherein the amount of PTMG unit is large, the influence of the molecular weight of the polymer on yarn properties is large and the Formula 1 indicated that the molecular weight should be higher than about 32000. Particularly preferable is to satisfy the requirement (molecular weight higher than about 40000) of the following Formula 2:

$$\eta_{sp./c.} \geq 0.05x - 1.45 \qquad (2)$$

It has been found that $\eta_{sp/c.}$ required to obtain an elastic yarn of a tenacity on a certain high level depends on the content of the PTMG unit and the Formulas 1 and 2 have been derived from extensive experiments. Though depending on the after-treating conditions, it is necessary to satisfy the Formula 1 in order to obtain an elastic yarn of a tenacity of more than about 0.6 g./d. and the Formula 2 in order to obtain an elastic yarn of tenacity of more than about 0.7 g./d. However, if the viscosity is too high, melt-spinning becomes difficult. Therefore, it is desirable to keep $\eta_{sp/c.}$ less than about 5. breaking elongation is high, the elastic yarn would not be If the molar ratio of PTMG to terephthalic acid or its derivative (such as, for example, dimethyl terephthalate) when they are charged in the reaction vessel is made 1:A, the percentage $x$ by weight of the PTMG unit in the resulting copolymer is calculated by the following Formula 3

$x$ (percent by weight of PTMG unit)

$$= \frac{\text{Molecular weight of PTMG} \times 100}{\text{Molecular weight of PTMG} + 132 + (A-1) \times 192} \quad (3)$$

wherein 132 is the molecular weight of the terephthaloyl group and 192 is the molecular weight of the ethylene terephthalate unit.

The percentages by weight of the PTMG unit calculated by the Formula 3 with various molecular weight of PTMG and molar ratio are shown in Table 2.

TABLE 2

| Molecular weight of PTMG | PTMG:dimethyl terephthalate (molar ratio) | | | | |
|---|---|---|---|---|---|
| | 1:3.0 | 1:3.5 | 1:4.0 | 1:4.5 | 1:5.0 |
| 1,800 | 77.8 | 74.7 | 71.8 | 69.1 | 66.7 |
| 2,000 | 79.6 | 76.6 | 73.8 | 71.3 | 69.0 |
| 2,200 | 81.0 | 78.3 | 75.7 | 73.2 | 71.0 |
| 2,500 | 82.9 | 80.4 | 77.9 | 75.6 | 73.5 |

In U.S. Pat. No. 3,023,192, it is mentioned that a copolymer of a molecular weight of 15,000 to 40,000 may be easily obtained. However, the molecular weight of the copolymer actually obtained in the examples given in the patent is presumed to be less than about 30,000. In contrast thereto, according to the present invention, there is required a molecular weight considerably higher than that. It has been found that this is not particularly difficult and that, if the below mentioned points are noted, a copolymer of a molecular weight exceeding 50,000 is easily obtained.

(a) The temperature of the polycondensation reaction should not be made too high but should be kept at about 240 to 255° C. When it is above 260° C., thermal decomposition becomes noticeable and it is difficult to obtain a product with a high molecular weight.

(b) The quality of the raw material PTMG should be noted. Particularly PTMG is likely to be oxidized in the course of the production or storing. It is very difficult to obtain a copolymer with a sufficiently high molecular weight from once oxidized and deteriorated PTMG.

(c) The selection of the catalyst should be noted. It is preferable to use a compound of zinc, antimony, germanium or titanium in order to easily obtain a copolymer with a satisfactorily high molecular weight.

(d) It is also effective to add a small amount of a stabilizer which is known to prevent the thermal decomposition of an organic substance, such as, for example, an alkyl substituted phenol. This is particularly useful in case PTMG is not pure or the reaction temperature is high.

The characteristics as important as the tenacity to an elastic yarn are the breaking elongation and elastic recovery. Particularly the elastic recovery may be said to be the most practically important property. Even if the breaking elongation is high, the elastic yarn would be not suitable for clothing, if the elastic recovery after the elongation is low. There are two kinds of elongations to which an elastic yarn for clothing is usually subjected, namely, an elongation of 150 to 350% in the knitting or weaving step and an elongation of about 40 to 70% in wearing the clothing. The elastic recovery from the former high elongation would influence so much on the finish of the product that, if it is low particularly in the case of circular knitting, the elongation of the knitted texture reduces and the width (diameter) becomes larger than desired. We have come to know that the conventional copolyester polyether elastic yarn is not so different from Spandex yarn in the recovery from a low elongation but is remarkably inferior in the recovery from a high elongation. We have also found that when the molecular weight of PTMG is 1800 to 2500 and the molar ratio of terephthalic acid to PTMG is 3–5 according to this invention, there can be obtained an elastic copolymer, which may be melt-spun into yarns having more than 90% elastic recovery from 300% elongation.

As shown later in Example 6, the elastic recovery from a high elongation depends greatly on the molecular weight or PTMG and its mol ratio to terephthalic acid. Thus, there is seen a tendency that, the higher the molecular weight of PTMG and the lower the mol ratio of terephthalic acid to PTMG, the higher the elastic recovery. Only when the molecular weight of PTMG is more than about 1800 and the molar ratio is less than about 5, an elastic recovery which is equal to or higher than that of Spandex is obtained. However, when the molecular weight of PTMG is too high, not only the elastic recovery no longer increased but also the elastic recovery at a low temperature near 0° C. (a characteristic which is a problem in the case of wearing in a cold season) reduces. Therefore, the upper limit of the molecular weight of PTMG is 2500. Further, the influence of the molar ratio of terephthalic acid to PTMG is not so different at a molar ratio of 4–3, but the influence on the melting point of the copolymer is not negligible at a molar ratio below 3.

The breaking elongation of an elastic yarn greatly varies depending on the particular treating conditions after the elastic yarn has been formed by melt-spinning. However, when compared under fixed after-treating conditions, the above indicated requirements in the present invention are desirable also to obtain an elastic yarn of a high elongation (refer to Table 3 in Example 6).

While the relations of the requirements of the present invention with the tenacity, elongation and elastic recovery which are fundamental characteristics of an elastic yarn have been described above, there can be obtained, according to the method of the present invention, an elastic yarn which is very satisfactory not only in the above mentioned three characteristics but also in such other characteristics as, for example, the initial modulus, stress decay, elastic recovery at low temperature, melting point and color.

The reaction of polyethylene terephthalate - forming component with PTMG may be conducted in any conventional manner. However, it is preferable that dimethyl terephthalate is reacted with ethylene glycol and PTMG to obtain bis(2 - hydroxyethyl)terephthalate, its precondensate and PTMG-terephthalate by an ester exchange, and then they are heated to be polycondensed under a reduced pressure. For the catalyst for the ester interchange reaction, there can be used an ester interchange catalyst well known in the production of polyethylene terephthalate. As preferable catalysts, there can be enumerated lower fatty acid salts such as of zinc and manganese. Further, as already described, for the catalyst for the polycondensation reaction, compounds of zinc, antimony, germanium and titanium are preferable. It is desirable to keep the reaction temperature at 240 to 255° C. It is also possible to conduct the direct esterification reaction of terephthalic acid with ethylene oxide or ethylene glycol instead of the ester interchange method, to produce bis(2 - hydroxyethyl)terephthalate or a mixture thereof with its precondensate. Then there is added PTMG. It is also possible to employ PTMG acetylated at the molecular terminal.

In the above description and the later given examples, the polyester is directed to polyethylene terephthalate and the polyether is directed to PTMG. However, this does not mean that the use of other copolymerizing components than terephthalic acid, ethylene glycol and PTMG is prohibited. Though depending on the kinds of the copolymerizing components, usually an aliphatic or aromatic dicarboxylic acid or hydroxy acid and another glycol than ethylene glycol each in an amount less than about 10 mol percent on the terephthalic acid can be used as copolymerizing components. Further, a small amount of a polyfunctional compound having three or more ester-forming functional groups in the molecule may be copolymerized. Further for the polyether, another poly(alkylene oxide)glycol including its random and block copolymers, up to about 10 mol percent on PTMG, can be used together with PTMG. These copolymerizing components are known in the art (e.g. U.S. Pat. No. 3,023,192). The use of these third copolymerizing components may be effective to improve a part of the properties of the resulting elastomer but may sometimes cause deterioration of the other properties such as reduction of the melting point. Usually, it is not necessary to employ such copolymerizing components.

The present invention will be further explained by means of the following examples. Some terms as used in this specification are defined as follows. As regards the items (4) to (7), the measurement is conducted at 20° C. In the examples, the parts are by weight unless otherwise specified.

(1) Molecular weight of PTMG

A pyridine reagent prepared by mixing 1 part by volume of acetic anhydride with 4 parts by volume of pyridine is reacted with PTMG at 95° C. for 1 hour. The amount of the consumed acetic anhydride is titrated with 0.5 N—NaOH (ethanol solution) to determine the OH value. If the OH value is B eq./g., the molecular weight (average molecular weight) of PTMG is 2/B.

(2) Molecular weight of polyester polyether block copolymer

The copolymer and succinic anhydride are reacted in dehydrated and purified xylene to convert the terminal hydroxyl groups of the copolymer to

—OCOCH$_2$CH$_2$COOH

The carboxyl group is titrated with 0.01 N—NaOH (benzyl alcohol solution) to determine the acid value. If the acid value is A eq./g., the molecular weight (average molecular weight) is 2/A. In this case, the molecular weight increases by the part of succinic acid introduced into the molecular terminal but the increase is neglected.

(3) Reduced specific viscosity $\eta_{sp./c.}$

This is a value measured at a concentration C=0.2 g./100 cc. at 30° C. by using a mixture of phenoltetrachlorethane (6:4 by weight).

(4) Tenacity

The load (g.) at which a sample 5 cm. long drawn at a rate of 1000% per minute is broken is divided by the initial denier is defined as the tenacity (g./d).

(5) Elongation

The rate of the elongation of the sample when it is broken in measuring the tenacity to the original length of the sample is defined as (breaking) elongation (percent).

(6) Elastic recovery (a) Recovery from 300% elongation.

A sample 5 cm. long is drawn by 300%, is left standing for 10 minute, is then relaxed from the elongation and is left standing for 10 minutes. Then the length $l$ (cm.) of the sample is measured and the recovery is calculated by the following formula:

$$\text{Elastic recovery (percent)} = \frac{5-(l-5)}{5} \times 100$$

(b) Recovery from 50% elongation.

A sample 10 cm. long is drawn by 50%, is left standing for 1 minute, is then relaxed from the elongation and is left standing for 1 minute. Then the length $l$ (cm.) of the sample is measured and the recovery is calculated by the following formula:

$$\text{Elastic recovery (percent)} = \frac{10-(l-10)}{10} \times 100$$

(7) Stress decay

A sample 5 cm. long is drawn at rate of 100% per minute until it is elongated by 50%. The load A (g./d.) at this time and the load B (g./d.) in 1 minute after stopping the drawing are measured and stress decay rate is calculated by the following formula:

$$\text{Stress decay (percent)} = \frac{A-B}{A} \times 100$$

(8) Melting point

A small piece of a sample is placed on a hot plate of a slight amount melting point measuring apparatus, is heated at a rate of 1° C. per minute and is observed with rectangularly intersecting polarized lights. The temperature at which the bright light goes out is taken as a melting point.

(9) Abbreviations

DMT: Dimethyl terephthalate.
PTMG: Poly(tetramethylene oxide)glycol.

EXAMPLE 1

3300 parts of WMT, 3300 parts of ethylene glycol, 5.75 parts of zinc acetate and 5.75 parts of germanium oxide were charged into a stainless steel reactor. The ester interchange reaction was completed at 140 to 230° C. in a nitrogen atomsphere. Then 345 parts of anatase type titanium dioxide dispersed in 510 parts of ethylene glycol were added thereto. Then 8500 parts of preheated PTMG having a molecular weight of 2000 and 23 parts of an antioxidant Ionox 330 (registered trademark, Shell Oil Company) were added thereto. The pressure was gradually reduced while heating and the reaction mixture was polycondensed at 245° C. under a high vacuum of less than 1 mm. Hg for 120 minutes. After the completion of the reaction, the copolymer was extruded into water with nitrogen gas and was cut into pellets. The melting point of the obtained copolymer was 202° C., $\eta_{sp./c.}$=3.20 and the molecular weight was 56,000.

These pellets were well dried, and added with 0.5% by weight of each of Sumilizer BBM and Sumilizer TPS (both trademarks of Sumitomo Chemical Co., Lt., Osaka, Japan) as stabilizers. Then the polymer was melt-spun at 235° C. into filaments, which were drawn 7 times the length at the room temperature and was shrunk at 100° C. to be 1/3.3 the length. The resulting elastic yarn was of an elongation of 630%, tenacity of 0.97 g./d., elastic recovery of 94.1% from an elongation of 300% and elastic recovery of 99.3% from an elongation of 50%.

EXAMPLE 2

7.76 parts of DMT, 7.80 parts of ethylene glycol, 20.0 parts of PTMG (molecular weight 2000), 0.014 part of zinc formate and 0.04 part of germanium tetrabutoxide were charged into a reaction vessel. The mixture was gradually heated to complete the ester interchange reaction up to 220° C. Then the heating was continued while gradually reducing the pressure, to conduct the polycondensation under a high vacuum of 1 mm. Hg for 120 minutes. The resulting copolymer was colorless and transparent and had a melting point of 202° C., $\eta_{sp./c.}$=3.40 and molecular weight of 60,000

The pellets of this copolymer was added with 0.5% by weight of each of Sumilizer BBM and Sumilizer TPS as stabilizers and were melt-spun at 240° C. The obtained filaments were drawn 7 times the length at the room temperature, and then shrunk at 110° C. to be 1/3.5 the length to obtain an elastic yarn of 420 deniers. It was of an elongation of 640%, tenacity of 0.95 g./d., elastic recovery of 93.9% from an elongation of 300%, elastic recovery of 99.3% from an elongation of 50% and stress decay of 2%. The modulus was 0.045 g./d. at 100% elongation, 0.11 g./d. at 200% elongation and 0.22 g./d. at 300% elongation.

EXAMPLE 3

The procedure of Example 2 was repeated except that the polycondensation was conducted from 80 minutes by using 0.014 part of antimony trioxide instead of the germanium tetrabutoxide. There was obtained a light yellow copolymer having a melting point of 202° C., $\eta_{sp./c.}=35.0$ and molecular weight of 61,000.

EXAMPLE 4

12.17 parts of bis(2-hydroxyethyl)terephthalate, 20.0 parts of PTMG (molecular weight 1800) and 0.014 part of zince acetate were charged into a reaction vessel at 200° C. The pressure was gradually reduced while heating, and the polycondensation was conducted under a high vacuum of less than 1 mm. Hg for 80 minutes. The obtained copolymer had a melting point of 208° C. and $\eta_{sp./c.}=3.03$.

An elastic yarn obtained from the pellets of this copolymer in the same manner as in Example 2 was of an elongation of 600%, tenacity of 0.9 g./d., elastic recovery of 91.2% from an elongation of 300% and stress decay of 3%.

EXAMPLE 5

7.39 parts of bis(2-hydroxyethyl)terephthalate, 20.0 parts of PTMG (molecular weight 2200), 0.012 part of zinc acetate and 0.012 part of antimony trioxide were treated in the same manner as in Example 4 to obtain a copolymer having a melting point of 168° C. and $\eta_{sp./c.}=3.51$.

An elastic yarn obtained from this copolymer in the same manner as in Example 2 was of an elongation of 750%, tenacity of 0.85 g./d., elastic recovery rate of 95.5% from an elongation of 300% and stress decay of 1.5%.

EXAMPLE 6

Copolymers of various compositions as shown in columns 1 and 2 in Table 3 were produced in the same manner as in Example 1 except that the molecular weight of PTMG and the amount of the charge were varied. They were melt-spun through an extruder and spinnerette at 240° C., and the filaments were drawn at the room temperture 6 to 7 times the length and were shrunk in nontensioned state at about 110° C. to obtain elastic yarns of 400 to 450 deniers. The properties of these elastic yarns are shown in columns 3 to 5 in Table 3.

TABLE 3

| Molecular weight of PTMG | DMT/PTMG molar ratio | Elongation (percent) | Tenacity (g./d.) | 300% elongation elastic recovery (percent) |
|---|---|---|---|---|
| 2,200 | 3.5 | 750 | 0.77 | 95.3 |
|  | 4 | 680 | 0.82 | 94.7 |
|  | 5 | 640 | 0.89 | 92.0 |
|  | 5.5 | 600 | 0.87 | 88.3 |
| 2,000 | 3.5 | 730 | 0.78 | 94.8 |
|  | 4 | 630 | 0.95 | 94.1 |
|  | 4.5 | 630 | 0.93 | 92.9 |
|  | 5 | 610 | 0.93 | 90.5 |
|  | 5.5 | 575 | 0.94 | 86.8 |
| 1,800 | 3.5 | 720 | 0.80 | 93.3 |
|  | 4 | 640 | 0.90 | 92.6 |
|  | 5 | 570 | 0.96 | 89.5 |
|  | 5.5 | 550 | 0.95 | 84.8 |
| 1,600 | 3.5 | 670 | 0.89 | 90.9 |
|  | 4 | 610 | 0.93 | 90.3 |
|  | 5 | 580 | 0.90 | 87.3 |
|  | 5.5 | 550 | 0.96 | 83.2 |
| Commercial Spandex A |  | 675 | 1.00 | 89.5 |

The elastic recovery from an elongation of 50% in the case of a molecular weight of PTMG of 2000 are shown in Table 4.

TABLE 4

| DMT/PTMG molar ratio | Elastic recovery (percent) from 50% elongation |
|---|---|
| 3.5 | 99.4 |
| 4 | 99.3 |
| 4.5 | 99.3 |
| 5 | 99.2 |
| 5.5 | 98.9 |

What we claim is:

1. An elastomeric polyester polyether block copolymer produced by polycondensing (1) (A) terephthalic acid or dimethyl terephthalate with (B) ethylene glycol and (C) poly (tetramethylene oxide) glycol or by poly-condensing (2) (D) bis (2-hydroxyethyl) terephthalate and (C) poly (tetramethylene oxide) glycol at a temperature of 240–255° C., wherein the molecular weight of the poly (tetramethylene oxide) glycol (C) is 1800–2200, the molar ratio of (C):(A) in (1) or (C):(D) in (2) at the time of charging is 1:3 to 1:4, and the polycondensation reaction is conducted until the reduced specific viscosity of the copolymer, as measured at a concentration of C=0.2 g./100 cc. at 30° C. in 6:4 by weight of phenol to tetrachloroethane, reaches a value represented by the formula:

$$\eta_{sp./c.} \geq 0.005x - 1.75$$

wherein $x$ is percent by weight of the poly (tetramethylene oxide) glycol unit in the copolymer.

2. An elastomeric polyester polyether block copolymer according to claim 1 wherein the polycondensation reaction is effected between (1) components (A), (B) and (C).

3. An elastomeric polyester polyether block copolymer according to claim 1 wherein the polycondensation reaction is effected between (2) components (C) and (D).

References Cited

UNITED STATES PATENTS

| | | | |
|---|---|---|---|
| 2,534,028 | 12/1950 | Izard | 260—75 |
| 3,013,914 | 12/1961 | Willard | 260—75 X |
| 3,023,192 | 2/1962 | Shivers | 260—75 |
| 3,161,710 | 12/1964 | Turner | 260—75 |
| 3,261,812 | 7/1966 | Bell et al. | 260—75 |

OTHER REFERENCES

Hill, Fibres From Synthetic Polymers, pp. 210 and 211, published 1953, Elsevier Publishing Co., New York, N.Y.

MELVIN GOLDSTEIN, Primary Examiner

U.S. Cl. X.R.

260—860